(12) United States Patent
Li et al.

(10) Patent No.: US 10,712,213 B2
(45) Date of Patent: Jul. 14, 2020

(54) PRESSURE SENSOR AND WEARABLE DEVICE

(71) Applicant: ZhuHai AdvanPro Technology Co.,Ltd., Guangdong (CN)

(72) Inventors: Ke Li, Guangdong (CN); Yangyong Wang, HongKong (CN); Fei Wang, Guangdong (CN); Zhongzhong Zhang, Guangdong (CN); Hanze Ye, Guangdong (CN)

(73) Assignee: ZhuHai AdvanPro Technology Co., Ltd., Guangdong (CN)

( * ) Notice: Subject to any disclaimer, the term of this patent is extended or adjusted under 35 U.S.C. 154(b) by 0 days.

(21) Appl. No.: 15/563,564

(22) PCT Filed: Sep. 30, 2017

(86) PCT No.: PCT/CN2017/087276
§ 371 (c)(1),
(2) Date: Sep. 30, 2017

(87) PCT Pub. No.: WO2018/133287
PCT Pub. Date: Jul. 26, 2018

(65) Prior Publication Data
US 2019/0331539 A1    Oct. 31, 2019

(30) Foreign Application Priority Data

Jan. 23, 2017  (CN) .......................... 2017 1 0063244

(51) Int. Cl.
*A61N 1/05* (2006.01)
*G01L 1/14* (2006.01)

(52) U.S. Cl.
CPC .... *G01L 1/146* (2013.01); *G06F 2203/04102* (2013.01)

(58) Field of Classification Search
CPC .... A61N 1/0551; A61N 1/36; A61N 1/37211; A61N 1/36117; A61N 1/3956;
(Continued)

(56) References Cited

U.S. PATENT DOCUMENTS 5,503,034 A * 4/1996 Amano .................... G01D 5/48
73/862.473
2016/0283007 A1* 9/2016 Ogura ................... G06F 3/0414

FOREIGN PATENT DOCUMENTS

CN       103091005 A    5/2013
CN       205050738 U    2/2016
(Continued)

*Primary Examiner* — Alesa Allgood
(74) *Attorney, Agent, or Firm* — Gang Yu

(57) ABSTRACT

The application provides a pressure sensor and a wearable device. The pressure sensor includes a circuit board and a conducting elastic structure; the circuit board includes an electrode area which includes multiple electrode pairs set at intervals; the conducting elastic structure is set on one side of the circuit board and includes a first area; the first area includes a conducting part; when no pressure is applied to the conducting elastic structure, the conducting part is isolated from each electrode pair, so that each electrode pair is in an off state; when a pressure which is greater than a turn-on pressure threshold is applied to the conducting elastic structure, the conducting elastic structure deforms, so that the conducting part contacts with at least one electrode pair, and at least one electrode pair is turned on; wherein the turn-on pressure thresholds of different electrode pairs are different.

16 Claims, 7 Drawing Sheets

(58) Field of Classification Search
CPC ............... A61N 1/0526; A61N 1/0529; A61N 1/36003; C25B 9/08
See application file for complete search history.

(56) References Cited

FOREIGN PATENT DOCUMENTS

| | | | |
|---|---|---|---|
| CN | 205334401 U | 6/2016 | |
| CN | 105808009 A | 7/2016 | |
| CN | 106644191 A | 5/2017 | |
| JP | H0926369 A * | 1/1997 | ............... G01L 5/00 |
| JP | H0926369 A | 1/1997 | |
| JP | 2010286239 A | 12/2010 | |

\* cited by examiner

PRESSURE SENSOR AND WEARABLE DEVICE

TECHNICAL FIELD

The application relates to the field of sensors, in particular to a pressure sensor and a wearable device.

BACKGROUND

There are reports related to pressure sensors used for smart wearable electronic devices. The major limitation of the pressure sensors are that there is only one single turn-on pressure of a pressure switch, so the pressure sensors cannot be applied to an application scenario with multiple turn-on pressure thresholds; in addition, output signals of these pressure sensors are continuous analog signals, which need to be converted into digital signals by means of analog-to-digital conversion to perform the following signal processing.

SUMMARY

The application is mainly intended to provide a pressure sensor and a wearable device, to solve the problem in the prior art that the pressure sensor cannot be applied to a scenario with multiple turn-on pressure thresholds.

To this end, according to an aspect of the application, a pressure sensor is provided; the pressure sensor includes: a circuit board, which includes an electrode area, wherein the electrode area includes multiple electrode pairs set at intervals; and a conducting elastic structure, which is set on one side of the circuit board and includes a first area; the first area includes a conducting part; when no pressure is applied to the conducting elastic structure, the conducting part is isolated from each electrode pair, so that each electrode pair is in an off state; when a pressure which is greater than a turn-on pressure threshold is applied to the conducting elastic structure, the conducting elastic structure deforms, so that the conducting part contacts with at least one electrode pair, and at least one electrode pair is turned on; wherein the turn-on pressure thresholds of different electrode pairs are different.

Furthermore, the electrode area is at central area of the circuit board; a projection of the electrode area on a first plane is in a projection of the conducting part on the first plane or overlaps with the projection of the conducting part on the first plane, wherein the first plane is vertical to the thickness direction of the circuit board.

Furthermore, the electrode area includes multiple cathodes and multiple anodes; the cathodes are in one-to-one correspondence with the anodes, and one cathode and the corresponding anode form one electrode pair; or the electrode area includes one cathode and multiple anodes; one cathode and multiple anodes form multiple electrode pairs respectively; or the electrode area includes one anode and multiple cathodes; one anode and multiple cathodes form multiple electrode pairs respectively.

Furthermore, the electrode area includes N electrode pairs; wherein, a projection of the (X−1)th electrode pair on the electrode area is inside of a projection of the Xth electrode pair on the electrode area, the cathode of the (X+1)th electrode pair is on one side, which is far away from the cathode of the (X−1)th electrode pair, of the cathode of the Xth electrode pair, and the anode of the (X+1)th electrode pair is on one side, which is far away from the anode of the (X−1)th electrode pair, of the anode of the Xth electrode pair.

Furthermore, each cathode and each anode include arc sections, vertical sections and inclined sections connected between the arc sections and the vertical sections.

Furthermore, the electrode area includes the cathodes and the anodes which are in one-to-one correspondence; the inclined sections of each cathode or each anode are on the same straight line.

Furthermore, each cathode and each anode include a first horizontal section, a first vertical section, a second horizontal section and a second vertical section, wherein the first horizontal section is parallel to the second horizontal section, the first vertical section is parallel to the second vertical section, the first vertical section is connected between the first horizontal section and the second horizontal section, and the second horizontal section is connected between the first vertical section and the second vertical section.

Furthermore, each electrode pair includes the cathodes and the anodes which are in one-to-one correspondence; the second horizontal sections of each cathode or each anode are on the same straight line.

Furthermore, the first area includes multiple first subareas, and the electrode area includes multiple electrode subareas; the first subareas and the electrode subareas are set in one-to-one correspondence; when no pressure is applied to the conducting elastic structure, distances between different first subareas and the electrode subareas at the corresponding positions are different.

Furthermore, the circuit board further includes a non-electrode area set around the electrode area, and the conducting elastic structure further includes a second area set around the first area; the pressure sensor further includes: a connecting part, which is set between the non-electrode area and the second area, and is used for fixedly connecting the non-electrode area and the second area; preferably, the connecting part is a pressure sensitive adhesive tape.

Furthermore, the circuit board further includes a non-electrode area set around the electrode area; the pressure sensor further includes: an elastic fixing part, which is set on the non-electrode area and around the conducting elastic structure, and is used for fixing the conducting elastic structure and the circuit board; preferably, the elastic fixing part is an elastic fixing ring.

According to another aspect of the application, a wearable device is provided, which includes a pressure sensor; the pressure sensor is described above.

By applying the technical solutions of the application, the circuit board of the pressure sensor in the application includes multiple electrode pairs, and the turn-on pressure thresholds corresponding to different electrode pairs are different; that is, when different pressures (which are greater than the turn-on pressure thresholds) are applied to the conducting elastic structure, different electrode pairs are turned on; for example, when the circuit board includes three electrode pairs, namely a first electrode pair, a second electrode pair and a third electrode pair, the three electrode pairs correspond to a first turn-on pressure threshold, a second turn-on pressure threshold and a third turn-on pressure threshold; when the pressure which is applied to the conducting elastic structure is less than the first turn-on pressure threshold, the conducting elastic structure deforms but is insufficient to make the conducting area contact with any electrode pair; that is, all of the three electrode pairs are not turned on; when the pressure applied is greater than the first turn-on pressure threshold and less than the second turn-on pressure threshold, the conducting elastic structure deforms to make the first electrode pair contact with the conducting area, so that the first electrode pair is turned on; when the pressure is increased gradually and between the second turn-on pressure threshold and the third turn-on pressure threshold, the deformation quantity of the conducting elastic structure increases gradually, so that the second electrode pair contacts with the conducting area, and the second electrode pair is turned on too; when the pressure is increased continuously and greater than the third turn-on pressure threshold, the deformation quantity of the conducting elastic structure further increases, so that the third electrode pair contacts with the conducting area, and the third electrode pair is turned on too. When the pressure applied to the conducting elastic structure is increased gradually, different electrode pairs are conducting successively, so the pressure sensor can be applied to the scenario with multiple turn-on pressure thresholds.

BRIEF DESCRIPTION OF THE DRAWINGS

The accompanying drawings described here are used for providing a deeper understanding of the application, and constitute a part of the application; schematic embodiments of the application and description thereof are used for illustrating the application and not intended to form an improper limit to the application. In the accompanying drawings.

The above accompanying drawings include the following reference numbers:

1. circuit board; 2. conducting elastic structure; 3. connecting part; 4. elastic fixing part; 11. electrode area; 12. non-electrode area; 21. first area; 22. second area; 10. electrode pair; 101. cathode; 102. anode; 01. arc section; 02. inclined section; 03. vertical section; 04. first horizontal section; 05. first vertical section; 06. second horizontal section. 07. second vertical section; 210. first subarea; 110. electrode subarea; 01'. fan-shaped sheet metal.

DETAILED DESCRIPTION OF THE EMBODIMENTS

Note that, the following elaboration is exemplary, aiming at providing a further description of the application. Unless specified otherwise, all technical and scientific terms used in the application have the same meanings as the ordinary skill in the art of the application usually understands.

Note that, the terms here are used for describing the specific implementation modes, but not intended to limit the exemplary implementation modes according to the application. Unless clearly specified otherwise in the context, the singular form used here is intended to include the plural form; moreover, it should be understood that when the term "contain" and/or "include" is used in the specification, it indicates that there are characteristics, steps, operations, components and/or a combination of them.

As introduced in the background, the pressure sensor in the prior art cannot be applied to a scenario with multiple turn-on pressure thresholds; for solving the technical problem, the application puts forward a pressure sensor and a wearable device.

Figure 1:
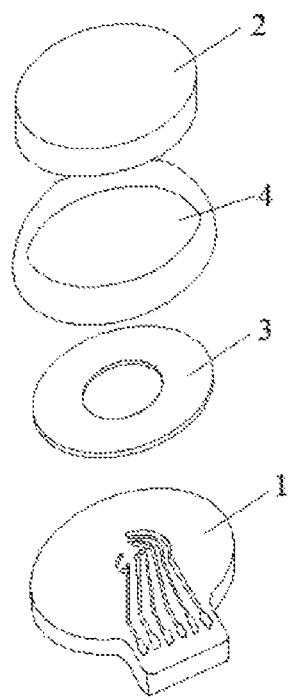
FIG. 1 shows a structure diagram of a pressure sensor provided in an embodiment of the application.
Figure 2:
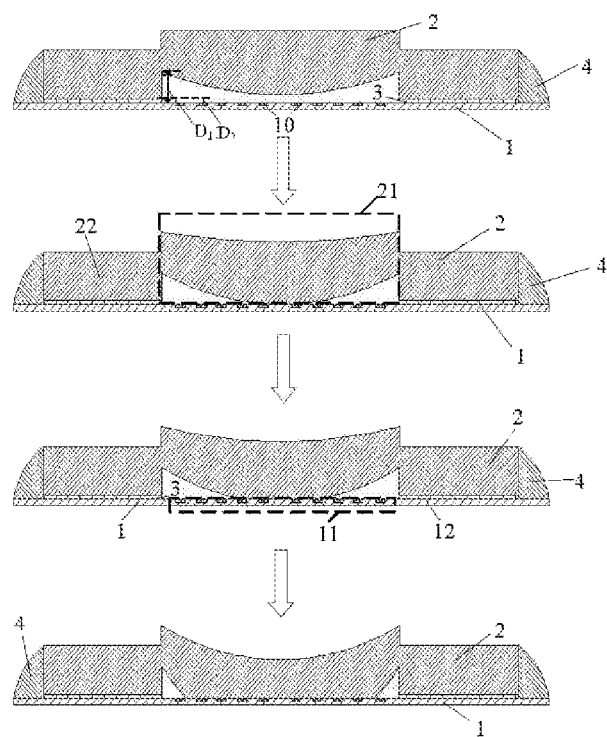
FIG. 2 shows a structure diagram of a pressure sensor in different working states provided in another embodiment of the application.
Figure 3:
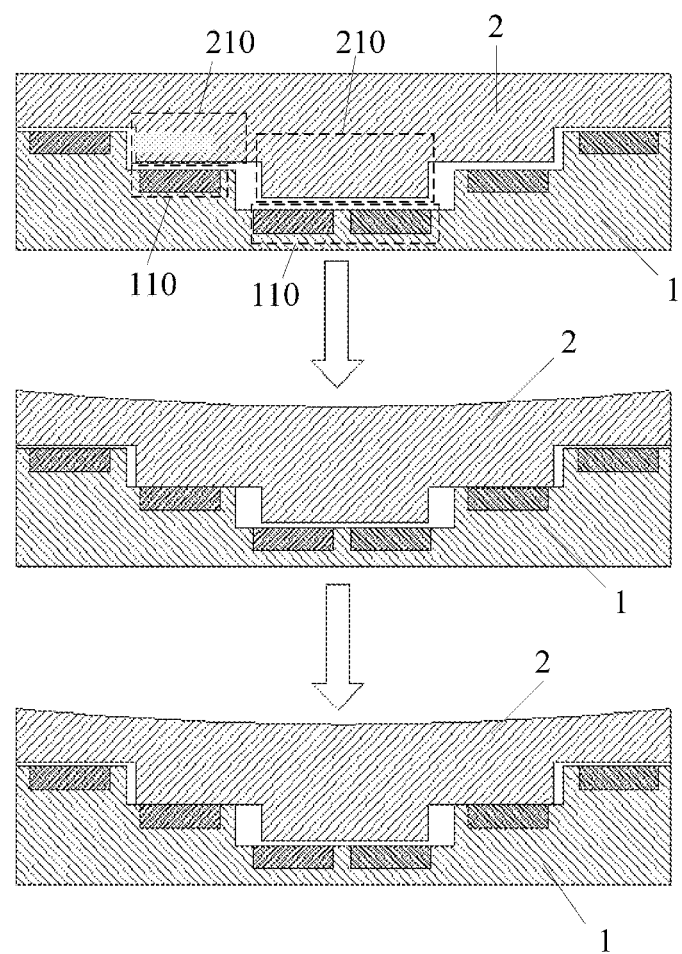
FIG. 3 shows a structure diagram of a pressure sensor in different working states provided in another embodiment of the application.
Figure 4:
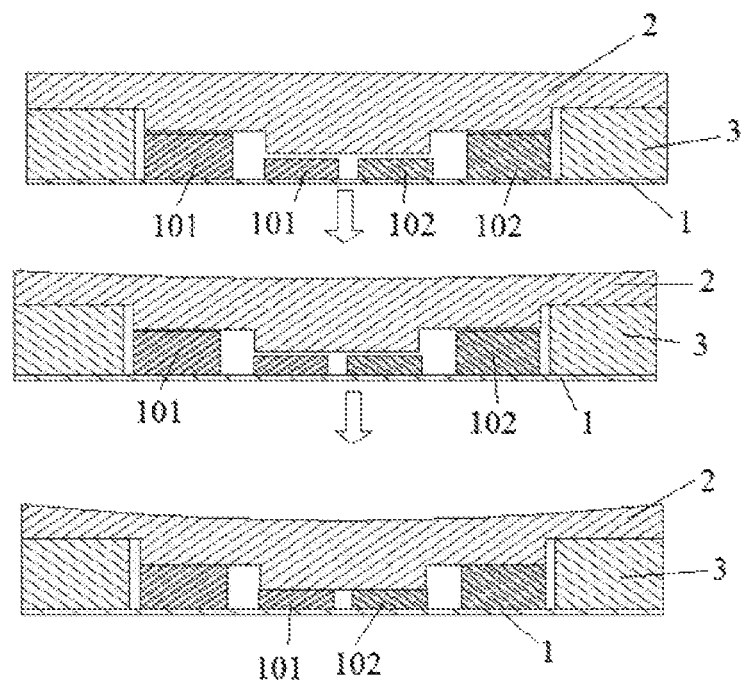
FIG. 4 shows a structure diagram of a pressure sensor in different working states provided in another embodiment of the application.

In a typical implementation mode of the application, a pressure sensor is provided; as shown in FIG. 1, the pressure sensor includes: a circuit board 1, which includes an electrode area 11 and a conducting elastic structure 2, wherein the electrode area 11 includes multiple electrode pairs 10 set at intervals; the conducting elastic structure 2 is set at one side of the circuit board 1 and includes a first area 21; the first area 21 includes a conducting part. The accompanying drawings FIG. 2 to FIG. 4 show a structure diagrams of the pressure sensor in different states (corresponding to no pressure is applied and different pressures are applied); when no pressure is applied to the conducting elastic structure 2, the conducting part is isolated from each electrode pair 10, so that each electrode pair 10 is in an off state; when a pressure which is greater than a turn-on pressure threshold is applied to the conducting elastic structure 2, the conducting elastic structure 2 deforms, so that the conducting part contacts with at least one electrode pair 10, and at least one electrode pair 10 is turned on; wherein the turn-on pressure thresholds of different electrode pairs 10 are different.

The circuit board of the pressure sensor includes multiple electrode pairs, and the turn-on pressure thresholds corresponding to different electrode pairs are different, that is, when different pressures (which are greater than the turn-on pressure thresholds) are applied to the conducting elastic structure, different electrode pairs are turned on; for example, when the circuit board includes three electrode pairs, namely a first electrode pair, a second electrode pair and a third electrode pair, the three electrode pairs correspond to a first turn-on pressure threshold, a second turn-on pressure threshold and a third turn-on pressure threshold; when no pressure is applied to the conducting elastic structure, the conducting elastic structure does not deform, and the conducting part of the conducting elastic structure is isolated from each electrode pair in the electrode area, the pressure sensor is in an off state; when the pressure which is applied to the conducting elastic structure is less than the first turn-on pressure threshold, the conducting elastic structure deforms but is insufficient to make the conducting area contact with any electrode pair; that is, all of the three electrode pairs are not turned on; when the pressure applied is greater than the first turn-on pressure threshold and less than the second turn-on pressure threshold, the conducting elastic structure deforms to make the first electrode pair contact with the conducting area, so that the first electrode pair is turned on; when the pressure is increased gradually and between the second turn-on pressure threshold and the third turn-on pressure threshold, the deformation quantity of the conducting elastic structure increases gradually, so that the second electrode pair contacts with the conducting area, and the second electrode pair is turned on too; when the pressure is increased continuously and greater than the third turn-on pressure threshold, the deformation quantity of the conducting elastic structure further increases, so that the third electrode pair contacts with the conducting area, and the third electrode pair is turned on too.

When the pressure applied to the conducting elastic structure is increased gradually, different electrode pairs are turned on successively, so the pressure sensor can be applied to the scenario with multiple turn-on pressure thresholds. When the pressure is removed, the conducting elastic structure restores, and the electrode pairs and the conducting part restore to the isolated state.

A range of the turn-on pressure threshold of the pressure sensor and a step precision (namely a difference value between the two turn-on pressure thresholds corresponding to the adjacent electrode pairs) of the turn-on pressure threshold can be adjusted according to the shape, size, height, density and distribution of an electrode in the electrode pair of the circuit board. Moreover, a pressure measuring range, repeatability and hysteresis of the pressure sensor can be adjusted by changing electrical property, mechanical property and geometric structure of the conducting elastic structure.

In addition, signals output by the pressure sensor in the prior art are continuous analog signals, and these analog signals need to be converted into digital signals by means of analog-to-digital conversion to facilitate the following data processing; but output signals of the pressure sensor in the application are step signals, and it is convenient to perform a following digitalization processing without need of performing analog-to-digital conversion, so a follow-up signal processing system can be simplified.

The conducting elastic structure in the application may include a conducting layer made of conducting materials and an elastomer made of elastic materials; wherein, the conducting layer serves as the conducting part; specifically, the conducting layer is composited with the elastic materials through laminating, coating, bonding, injection molding or compounding, and other molding processing technologies to form the conducting elastic structure; in addition, the materials with different electrical resistivity can be selected according to the actual conditions.

The conducting elastic structure in the application may also include the conducting layer made of composite materials including the conducting material and the elastic material; specifically, the conducting elastic structure can be formed through compounding, laminating, coating, bonding or injection molding.

The elastic material in the conducting elastic structure in the application can be one or more of polyurethane resin, flexible polyurethane foam, silicone rubber, polyacrylic resin, elastic segmented copolymer and flexible metal; the conducting elastic structure has excellent resilience, fatigue and durability, and mechanical property; the conducting elastic structure can adjust the range of the turn-on pressure threshold, repeatability and hysteresis of the pressure sensor through structure design, electrical property and mechanical property.

The circuit board in the application can be a flexible circuit board, a non-flexible circuit board, or a film or a plate with a printed conducting layer. The circuit board includes the electrode area, and the electrode area includes the electrode pair; the range of the turn-on pressure threshold and the difference value between the turn-on pressure thresholds corresponding to the adjacent electrode pairs are adjusted according to width, density, distribution and thickness of the electrode in the electrode pair. Moreover, those skilled in the art can select the conducting materials with different electrical resistivity according to the actual conditions to form the electrode in the electrode pair.

In the application, projections of the conducting part and the electrode area on a first plane only need to satisfy a condition that they have an overlapped part, and the electrode area corresponding to the overlapped part must include at least two electrode pairs, then the application of the scenario with multiple turn-on pressure thresholds can be realized.

Specifically, on the basis of satisfying the above condition, sizes of the areas of the projections of the conducting part and the electrode area on the first plane can be set according to the actual conditions. For example, the area of the projection of the conducting part on the first plane can be either smaller than or bigger than the area of the projection of the electrode area on the first plane.

For realizing that all the electrode pairs in the electrode area are turned on, and further ensuring that the pressure sensor can be applied to the scenario with multiple turn-on pressure thresholds, in an embodiment of the application, as shown in FIG. 2, the electrode area 11 is at the central area of the circuit board 1; the projection of the electrode area 11 on the first plane is in the projection of the conducting part on the first plane or overlaps with the projection of the conducting part on the first plane, wherein the first plane is vertical to a thickness direction of the circuit board 1.

Note that, each electrode pair in the application corresponds to two electrodes, one of which is the cathode, and the other is the anode; and the anodes and the cathodes in the multiple electrode pairs in the electrode area are not necessarily in one-to-one correspondence; that is, the numbers of the anodes and the cathodes are not necessarily the same; the anodes and the cathodes can also be one-to-many, that is, one anode corresponds to multiple cathodes or a cathode corresponds to multiple anodes; for example, the cathode area includes five cathodes and one anode, and each of the five cathodes and one anode form one electrode pair, and then five electrode pairs in the electrode area are formed; the anodes and the cathodes can also be many-to-many, that is, multiple anodes correspond to multiple cathodes; for example, the cathode area includes two cathodes and four anodes, wherein each cathode corresponds to two anodes, each cathode and the corresponding anode form one electrode pair, and then four electrode pairs in the electrode area are formed.

Figure 5:
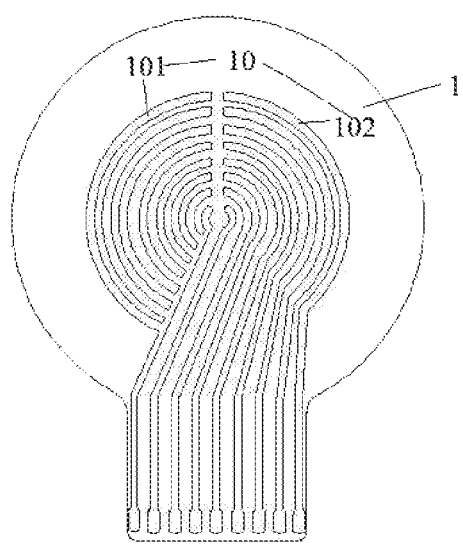
FIG. 5 (a), FIG. 5 (b), FIG. 5 (c), FIG. 5 (d), FIG. 5 (e), FIG. 5 (f) and FIG. 5 (g) show a structure diagram of a circuit board provided in seven embodiments of the application.
Figure 5:
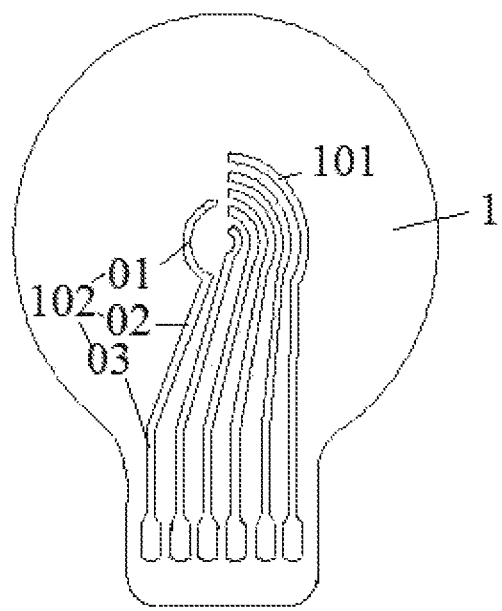
Figure 5:
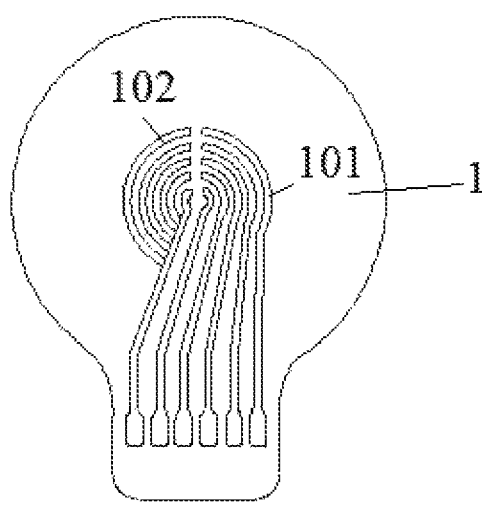
Figure 5:
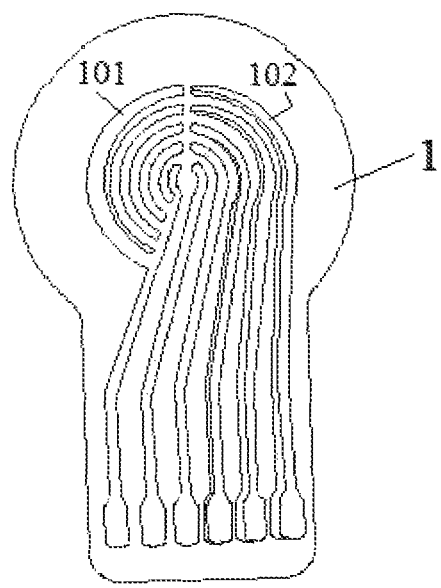
Figure 5:
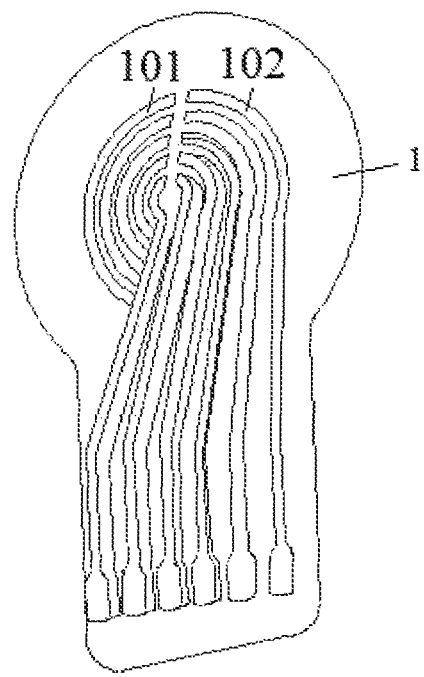
Figure 5:
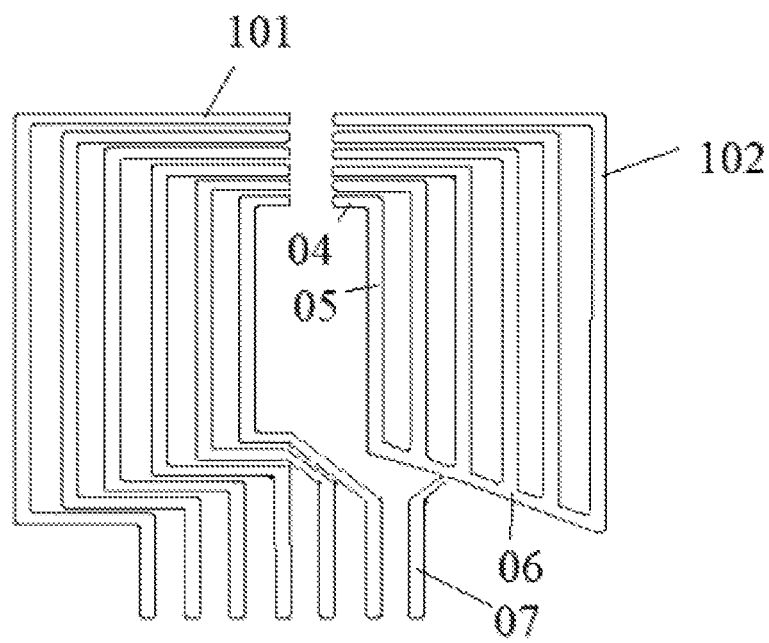
Figure 5:
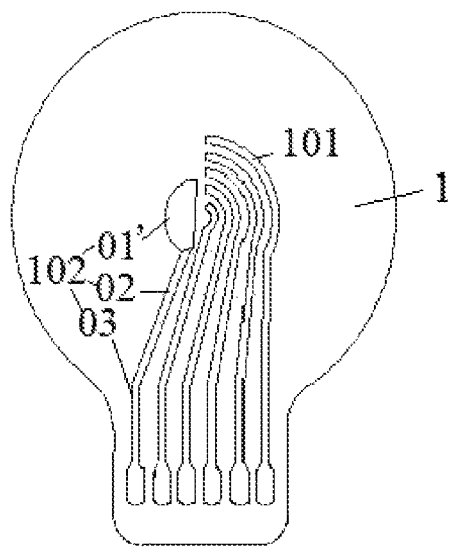

In an embodiment of the application, as shown in FIG. 5 (a), FIG. 5 (c), FIG. 5 (d) and FIG. 5 (e), the electrode area includes multiple anodes 102 and multiple cathodes 101; the anodes 102 and the cathodes 101 are in one-to-one correspondence, and one anode 102 and the corresponding cathode 101 form one electrode pair 10.

In another embodiment of the application, the electrode area includes one cathode and multiple anodes, and one cathode and multiple anodes form multiple electrode pairs respectively; or the electrode area includes one anode and multiple cathodes, and one anode and multiple cathodes form multiple electrode pairs respectively; FIG. 5 (b) shows the situation where one anode 102 corresponds to multiple cathodes 101.

In a specific embodiment of the application, as shown in FIG. 5 (a) to FIG. 5 (g), the electrode area 11 includes N electrode pairs 10, which are respectively the first electrode pair, the second electrode pair, . . . , the (X−1)th electrode pair, the Xth electrode pair, the (X+1)th electrode pair, . . . , the Nth electrode pair; each electrode pair 10 includes a cathode 101 and an anode 102; the projection of the (X−1)th electrode pair 10 on the electrode area 11 is inside of a projection of the Xth electrode pair 10 on the electrode area 11, the cathode 101 of the (X+1)th electrode pair 10 is on one side, which is far away from the cathode 101 of the (X−1)th electrode pair 10, of the cathode 101 of the Xth electrode pair 10, and the anode 102 of the (X+1)th electrode pair 10 is on one side, which is far away from the anode 102 of the (X−1)th electrode pair 10, of the anode 102 of the Xth electrode pair 10. In such a manner, the electrode pairs are successively set far away from the center of the electrode area, and the cathode and the anode of each electrode pair are respectively set at two sides of the center, when the pressure applied to the conducting elastomer is increased gradually, the electrode pairs are turned on successively, thereby further ensuring that the pressure sensor can be applied to the scenario with multiple turn-on pressure thresholds.

In another embodiment of the application, as shown in FIG. 5 (a), FIG. 5 (b), FIG. 5 (c), FIG. 5 (d) and FIG. 5 (e), each cathode 101 and each anode 102 include arc sections 01, vertical sections 03 and inclined sections 02 connected between the arc sections 01 and the vertical sections 03.

In order to simplify a manufacturing process of the pressure sensor, in an embodiment of the application, when the electrode area includes the cathodes and the anodes in one-to-one correspondence, the inclined sections of the cathodes and the anodes are on the same straight line; FIG. 5 (a), FIG. 5 (c), and FIG. 5 (e) show the situation where the inclined sections 2 of the cathodes 101 are on the same straight line; FIG. 5 (d) shows the situation where the inclined sections 2 of the anodes 102 are on the same straight line.

However, the cathodes and the anodes are not limited to a structure of having the arc sections, the inclined sections and the vertical sections; those skilled in the art can select a specific structure of them according to the actual conditions; both of them can have the above structure, or none of them has the above structure, or one of them has the above structure.

In another embodiment of the application, as shown in FIG. 5 (f), each cathode 101 and each anode 102 include a first horizontal section 04, a first vertical section 05, a second horizontal section 06 and a second vertical section 07, wherein the first horizontal section 04 is parallel to the second horizontal section 06, the first vertical section 05 is parallel to the second vertical section 07, the first vertical section 05 is connected between the first horizontal section 04 and the second horizontal section 06, and the second horizontal section 06 is connected between the first vertical section 05 and the second vertical section 07.

In another embodiment of the application, FIG. 5 (g) shows the situation where an anode 102 corresponds to multiple cathodes 101; a structure of each cathode 101 is the same as a structure of the cathode 101 shown in FIG. 5(b); for the anode 102, a difference between the anode in FIG. 5 (b) and it is that the anode 102 does not include the arc section 01, but include a fan-shaped sheet metal 01'; the anode with this structure can control the turnon sequence between the cathode 102 and it better, so that the pressure sensor can be applied to the scenario with multiple turn-on pressure thresholds better.

In order to simplify the manufacturing process of the pressure sensor, in an embodiment of the application, when the electrode area includes the cathodes and the anodes in one-to-one correspondence, the second horizontal sections of the cathodes and the anodes are on the same straight line; FIG. 5 (f) shows that the second horizontal sections 06 of the anodes 102 are on the same straight line.

Certainly, the cathodes and the anodes are not limited to a structure of having the first horizontal section, the first vertical section, the second horizontal section and the second vertical section; those skilled in the art can select a specific structure of them according to the actual conditions; both of them can have the above structure, or none of them has the above structure, or one of them has the above structure.

In another embodiment of the application, as shown in FIG. 2, the circuit board 1 further includes a non-electrode area 12; the non-electrode area 12 is set around the electrode area 11. The setting of the non-electrode area facilitates fixing the circuit board with the conducting elastic structure.

The circuit board of the application includes a substrate and multiple electrode pairs set in the substrate or on the surface of the substrate; the multiple electrode pairs are set at intervals, and the area where the multiple electrode pairs are is the electrode area. Except the structure and setting mode of the electrode in the circuit board in the application which are different from that in the prior art, other characteristics of the circuit board, like a material of the electrode and a material of the substrate, are the same as that in the prior art, so they will not be repeated here.

A shape of the conducting elastic structure in the application can be any shape able to achieve the technical effects of the application, like cylinder, cuboid or an irregular shape. Those skilled in the art can set the conducting elastic structure with a proper shape according to the actual conditions.

Figure 6:
FIG. 6 (a), FIG. 6 (b), FIG. 6 (c), FIG. 6 (d) and FIG. 6 (e) show a structure diagram of a conducting elastic structure provided in five embodiments of the application.
Figure 6:
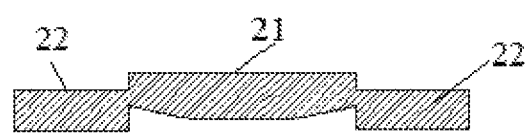
Figure 6:
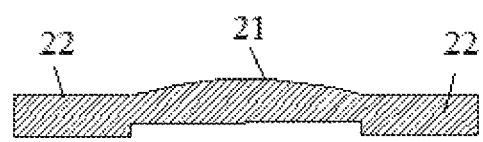
Figure 6:
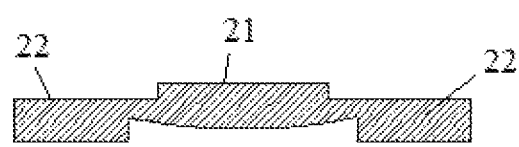
Figure 6:
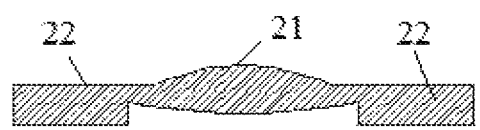

In an embodiment of the application, as shown in FIG. 6 (a), FIG. 6 (b), FIG. 6 (c), FIG. 6 (d) and FIG. 6 (e), a surface, which is close to the electrode area 11, of a first area 21 is a curved surface or a flat surface; a surface, which is far away from the electrode area 11, of the first area 21 is a curved surface or a flat surface.

In another embodiment of the application, as shown in FIG. 6 (a), FIG. 6 (b), FIG. 6 (c), FIG. 6 (d) and FIG. 6 (e), a surface, which is close to the circuit board, of a second area 22 protrudes from the surface, which is close to the circuit board, of the first area; a surface, which is far away from the electrode area 11, of the first area 21 protrudes from the surface, which is far away from the electrode area 11, of the second area 22.

In order to fix the conducting elastic structure on the circuit board better, in an embodiment of the application, as shown in FIG. 2 and FIG. 4, the conducting elastic structure 2 further includes the second area 22 set around the first area 21; when on pressure is applied to the conducting elastic structure 2, in the thickness direction of the circuit board 1, a distance between the surface, which is close to the electrode area 11, of the first area 21 and the circuit board 1 is $D_1$, a distance between a surface, which is close to the electrode area 11, of the second area 22 and the circuit board 1 is $D_2$, and $D_1 > D_2$.

In another embodiment of the application, as shown in FIG. 3 and FIG. 4, the first area 21 includes multiple first subareas 210; when no pressure is applied to the conducting elastic structure 2, distances between different first subareas 210 and the electrode area 11 at the corresponding position are different, the corresponding position here is right below.

In order to control the conduction of multiple electrode pairs better, in an embodiment of the application, as shown In FIG. 3 and FIG. 4, the electrode area 11 includes multiple electrode subareas 110; the first subareas 210 and the electrode subareas 110 are set in one-to-one correspondence; and distances between the different first subareas 210 and the electrode subareas 110 at the corresponding positions are different; the corresponding position here is right below.

Because the electrode pair can be set on the surface of the substrate or in the substrate, the electrode subarea can be either an area only including the electrode, or an area including the substrate and the electrode. When the electrode subarea is the area only including the electrode, by setting thicknesses of the electrodes different, the distance between the electrode and the circuit board or the first subarea is different, as shown in FIG. 5 (*d*) and FIG. 5 (*e*).

Note that, the pressure sensor including the electrode subarea unnecessarily includes the first subarea, can also not include the first subarea; both the first subarea and the electrode subarea can exist in the pressure sensor separately or at the same time; those skilled in the art can set according to the actual conditions.

In order to fix the conducting elastic structure on the circuit board better, in an embodiment of the application, as shown in FIG. 2 and FIG. 4, the pressure sensor further includes a connecting part 3, which is set between the non-electrode area 12 and the second area 22, and is used for fixedly connecting the non-electrode area 12 and the second area 22.

A material of the connecting part in the application can be metal material, organic material and/or inorganic nonmetallic material; the connecting part enables the connection mode between the circuit board and the conducting elastic structure to be one or more of bonding, joggle joint, welding, hinge joint, latching and threaded connection.

In order to realize the connection between the circuit board and the conducting elastic structure simply, the material of the connecting part is polymer material, and the connection mode is bonding. Specifically, the connecting part can adopt a solvent adhesive tape, an emulsion adhesive tape, a hot-melt adhesive tape, a pressure sensitive adhesive tape, a calendered adhesive tape or a reactive adhesive tape.

In another embodiment of the application, the connecting part is the pressure sensitive adhesive tape, which can further ensure a reliability of connection between the conducting elastic structure and the circuit board.

In order to further connect the circuit board and the conducting elastic structure in the pressure sensor fixedly, and further ensure the shear resistance performance, anti-impact property and, fatigue and durability of the pressure sensor are enhanced, in an embodiment of the application, as shown in FIG. 1 and FIG. 2, the pressure sensor further includes an elastic fixing part 4; the elastic fixing part 4 is set on the non-electrode area 12 and around the conducting elastic structure 2, and is used for fixing the conducting elastic structure 2 and the circuit board 1.

A material of the elastic fixing part can be selected from one or more of acrylic resin, epoxy resin, hot melt adhesive, unsaturated polyester, room temperature vulcanized silicone rubber and high temperature vulcanized silicone rubber.

In order to simplify the process, in an embodiment of the application, room temperature vulcanized silicone rubber is adopted as the material of the elastic fixing part; the material can be composited, through dispensing, coating, bonding and injection molding, on a conducting plate and surrounds the conducting elastic structure.

In another embodiment of the application, as shown in FIG. 1, the elastic fixing part 4 is an elastic fixing ring. The elastic fixing ring is simple in structure and convenient to install.

A method for manufacturing the pressure sensor in the application can be any method that can obtain the pressure sensor; in a specific embodiment, the method for manufacturing the pressure sensor includes the following steps: the conducting layer and the elastic material are prepared into the conducting elastic structure through the molding processing technology; when the conducting elastic structure is fixedly connected with the circuit board by bonding, after bonding, a normal pressure (which is parallel to the thickness direction of the circuit board) with a certain duration is applied to the conducting elastic structure, so as to enhance a bonding strength; and the conducting elastic structure is fixedly connected with the circuit board by the connecting part.

In another embodiment of the application, the method for manufacturing further includes that the material of the elastic fixing part is composited around the conducting elastic structure and on the circuit board by the process.

In another typical implementation mode of the application, a wearable device is provided; the wearable device includes the pressure sensor, and the pressure sensor is any pressure sensor described above.

The wearable device has multiple turn-on pressure thresholds, which improves its practicability; and because the output signals of the pressure sensor are the step signals, there is no need to perform the analog-to-digital conversion, thereby simplifying a signal processing device in the wearable device.

Specifically, the wearable device can be, but is not limited to, smart shoes and insoles, smart socks, smart cushions, smart clothing and other wearable smart textiles; those skilled in the art can apply the pressure sensor to any fields according to the actual conditions.

It can be seen from the above description that the embodiment of the application achieves the following technical effects:

(1) the pressure sensor in the application can be applied to the scenario with multiple turn-on pressure thresholds, the output signals of the pressure sensor are the step signals, and it is convenient to perform the following digitalization processing without need of performing analog-to-digital conversion, so the follow-up signal processing system can be simplified;

(2) the wearable device in the application has multiple turn-on pressure thresholds, which improves its practicability; and because the output signals of the pressure sensor are the step signals, there is no need to perform the analog-to-digital conversion, thereby simplifying the signal processing device in the wearable device.

The above is only the preferred embodiment of the application and not intended to limit the application; for those skilled in the art, the application may have various modifications and changes. Any modifications, equivalent replacements, improvements and the like within the spirit and principle of the application shall fall within the scope of protection of the application.

What is claimed is:

1. A pressure sensor, comprising:
    a circuit board (1), which comprises an electrode area (11), wherein the electrode area (11) comprises multiple electrode pairs (10) set at intervals; and
    a conducting elastic structure (2), which is set on one side of the circuit board (1) and comprises a first area (21); the first area (21) comprises a conducting part; when no pressure is applied to the conducting elastic structure (2), the conducting part is isolated from each electrode pair (10), so that each electrode pair (10) is in an off state; when a pressure which is greater than a turn-on pressure threshold is applied to the conducting elastic structure (2), the conducting elastic structure (2)

deforms, so that the conducting part contacts with at least one electrode pair (10), and at least one electrode pair (10) is turned on; wherein the turn-on pressure thresholds of different electrode pairs (10) are different, wherein the electrode area (11) comprises multiple cathodes (101) and multiple anodes (102); the cathodes (101) are in one-to-one correspondence with the anodes (102), and one cathode (101) and the corresponding anode (102) form one electrode pair (10); or the electrode area (11) comprises one cathode (101 and multiple anodes (102); one cathode (101) and multiple anodes (102) form multiple electrode pairs (10) respectively; or the electrode area (11) comprises one anode (102) and multiple cathodes (101); one anode (102) and multiple cathodes (101) form multiple electrode pairs (10) respectively, wherein each cathode (101) and each anode (102) comprise a first horizontal section (04), a first vertical section (05), a second horizontal section (06) and a second vertical section (07), wherein the first horizontal section (04) is parallel to the second horizontal section (06), the first vertical section (05) is parallel to the second vertical section (07), the first vertical section (05) is connected between the first horizontal section (04) and the second horizontal section (06), and the second horizontal section (06) is connected between the first vertical section (05) and the second vertical section (07), wherein the conducting part is made of composite material including conducting material and the elastic material.

2. The pressure sensor as claimed in claim 1, wherein the electrode area (11) is at central area of the circuit board (1); a projection of the electrode area (11) on a first plane is in a projection of the conducting part on the first plane or overlaps with the projection of the conducting part on the first plane, wherein the first plane is vertical to the thickness direction of the circuit board (1).

3. The pressure sensor as claimed in claim 1, wherein the electrode area (11) comprises N electrode pairs (10); wherein, a projection of the (X−1)th electrode pair (10) on the electrode area (11) is inside of a projection of the Xth electrode pair (10) on the electrode area (11), the cathode (101) of the (X+1)th electrode pair (10) is on one side, which is far away from the cathode (101) of the (X−1)th electrode pair (10), of the cathode (101) of the Xth electrode pair (10), and the anode (102) of the (X+1)th electrode pair (10) is on one side, which is far away from the anode (102) of the (X−1)th electrode pair (10), of the anode (102) of the Xth electrode pair (10).

4. The pressure sensor as claimed in claim 1, wherein each electrode pair (10) comprises the cathodes (101) and the anodes (102) which are in one-to-one correspondence; the second horizontal sections (06) of each cathode (101) or each anode (102) are on the same straight line.

5. The pressure sensor as claimed in claim 1, wherein the first area (21) comprises multiple first subareas (210), and the electrode area (11) comprises multiple electrode subareas (110); the first subareas (210) and the electrode subareas (110) are set in one-to-one correspondence; when no pressure is applied to the conducting elastic structure (2), distances between different first subareas (210) and the electrode subareas (110) at the corresponding positions are different.

6. The pressure sensor as claimed in claim 1, wherein the circuit board (1) further comprises a non-electrode area (12) set around the electrode area (11), and the conducting elastic structure (2) further comprises a second area (22) set around the first area (21); the pressure sensor further comprises:

a connecting part (3), which is set between the non-electrode area (12) and the second area (22), and is used for fixedly connecting the non-electrode area (12) and the second area (22); preferably, the connecting part (3) is a pressure sensitive adhesive tape.

7. The pressure sensor as claimed in claim 1, wherein the circuit board (1) further comprises a non-electrode area (12) set around the electrode area (11); the pressure sensor further comprises:

an elastic fixing part (4), which is set on the non-electrode area (12) and around the conducting elastic structure (2), and is used for fixing the conducting elastic structure (2) and the circuit board (1); preferably, the elastic fixing part (4) is an elastic fixing ring.

8. The pressure sensor as claimed in claim 1, wherein each cathode (101) and each anode (102) comprise arc sections (01), vertical sections (03) and inclined sections (02) connected between the arc sections (01) and the vertical sections (03).

9. The pressure sensor as claimed in claim 8, wherein the electrode area (11) comprises the cathodes (101) and the anodes (102) which are in one-to-one correspondence; the inclined sections (02) of each cathode (101) or each anode (102) are on the same straight line.

10. A wearable device, comprising a pressure sensor; wherein, the pressure sensor is the one as claimed in claim 1.

11. The wearable device as claimed in claim 10, wherein the electrode area (11) is at central area of the circuit board (1); a projection of the electrode area (11) on a first plane is in a projection of the conducting part on the first plane or overlaps with the projection of the conducting part on the first plane, wherein the first plane is vertical to the thickness direction of the circuit board (1).

12. The wearable device as claimed in claim 10, wherein the electrode area (11) comprises N electrode pairs (10); wherein, a projection of the (X−1)th electrode pair (10) on the electrode area (11) is inside of a projection of the Xth electrode pair (10) on the electrode area (11), the cathode (101) of the (X+1)th electrode pair (10) is on one side, which is far away from the cathode (101) of the (X−1)th electrode pair (10), of the cathode (101) of the Xth electrode pair (10), and the anode (102) of the (X+1)th electrode pair (10) is on one side, which is far away from the anode (102) of the (X−1)th electrode pair (10), of the anode (102) of the Xth electrode pair (10).

13. The wearable device as claimed in claim 10, wherein each electrode pair (10) comprises the cathodes (101) and the anodes (102) which are in one-to-one correspondence; the second horizontal sections (06) of each cathode (101) or each anode (102) are on the same straight line.

14. The wearable device as claimed in claim 10, wherein the first area (21) comprises multiple first subareas (210), and the electrode area (11) comprises multiple electrode subareas (110); the first subareas (210) and the electrode subareas (110) are set in one-to-one correspondence; when no pressure is applied to the conducting elastic structure (2), distances between different first subareas (210) and the electrode subareas (110) at the corresponding positions are different.

15. The wearable device as claimed in claim 10, wherein each cathode (101) and each anode (102) comprise arc sections (01), vertical sections (03) and inclined sections (02) connected between the arc sections (01) and the vertical sections (03).

16. The wearable device as claimed in claim 15, wherein the electrode area (11) comprises the cathodes (101) and the anodes (102) which are in one-to-one correspondence; the inclined sections (02) of each cathode (101) or each anode (102) are on the same straight line.

\* \* \* \* \*